United States Patent [19]

Shockney et al.

[11] Patent Number: 4,925,611

[45] Date of Patent: May 15, 1990

[54] MOLD MAKING METHOD

[75] Inventors: Charles H. Shockney, Huntsville; Roger L. Hill, Decatur; William T. White, Huntsville, all of Ala.

[73] Assignee: USBI Company, Huntsville, Ala.

[21] Appl. No.: 110,767

[22] Filed: Oct. 19, 1987

[51] Int. Cl.$^5$ ............................................. B29C 41/22
[52] U.S. Cl. .................................... 264/135; 264/137; 264/219; 264/225; 264/258; 249/114.1; 249/134
[58] Field of Search .............. 264/219, 258, 135, 225, 264/137; 249/134, 114.1, 115

[56] References Cited

U.S. PATENT DOCUMENTS

| | | | |
|---|---|---|---|
| 2,956,916 | 10/1960 | Voss | 264/258 |
| 3,041,131 | 6/1962 | Juras | 264/258 |
| 3,064,314 | 11/1962 | Gagne | 264/219 |
| 3,242,247 | 3/1966 | Watson | 264/219 |
| 3,317,178 | 5/1967 | Kreier | 249/134 |
| 3,427,689 | 2/1969 | Windecker | 249/134 |
| 4,073,049 | 2/1978 | Lint | 264/219 |
| 4,675,061 | 6/1987 | Mead | 264/219 |
| 4,834,929 | 5/1989 | Dehoff et al. | 264/226 |

*Primary Examiner*—Jay H. Woo
*Assistant Examiner*—Jeremiah F. Durkin, II

[57] ABSTRACT

A method of making molds which is easy, quick and can be accomplished at room temperatures and atmospheric pressures. The method includes applying at least one layer of gel to a male mandrel and curing at least one layer of polyester impregnated fabric to the gel layer. At least one layer of epoxy impregnated fabric is cured to the polyester impregnated fabric. At least one layer of plaster impregnated is cured to the epoxy impregnated fabric. At least one layer of epoxy impregnated fabric is cured to the plaster impregnated fabric. The resulting mold is removed from the male mandrel.

1 Claim, No Drawings

MOLD MAKING METHOD

This invention was made with Government support under a contract awarded by the National Aeronautics and Space Administration. The Government has certain rights in this invention.

TECHNICAL FIELD

The field of art to which this invention pertains is methods of making molds and molds made by said methods.

BACKGROUND ART

Ablatives are materials that absorb heat and energy by transforming from one physical form to another. Typically, ablatives are used in a variety of aerospace applications. For example, most rockets have ablative coatings on surfaces that will be exposed to high temperature conditions during launch and during re-entry to the earth's atmosphere. The ablative material protects the rocket and critical hardware from high temperature by absorbing the heat. Typically, the ablative materials are applied to substrates/hardware by troweling. The troweling procedure consists of hand troweling the ablative material onto a metal substrate. Even distribution is obtained by seating the substrate within a frame and then applying and leveling the coating composition to the desired thickness. After cure at ambient temperature, the coating composition is removed from the frame. However, there are a variety of hardware surfaces containing protuberances to which hand troweling cannot be accomplished. Another method for applying ablatives is to bond sheets of ablative materials to a surface as pressure is applied under a vacuum bag. Vacuum bagging can be time consuming and is subject to bag leaks. Yet another method of application is the molding of ablatives to an independent mold of the protuberances, removal of the ablative shape from the mold, and subsequent bonding to the configured hardware surface. However, the production of molds is typically slow and labor intensive.

Accordingly, there has been a continual search in this field of art for methods of forming ablative materials into desired shapes.

DISCLOSURE OF INVENTION

This invention is directed to a method of making molds which is easy, quick and can be accomplished at room temperatures and atmospheric pressures. The method comprises applying at least one layer of gel to a male mandrel and curing at least one layer of polyester impregnated fabric to the gel layer. At least one layer of epoxy impregnated fabric is cured to the epoxy impregnated fabric. At least one layer of plaster impregnated fabric is cured to the epoxy impregnated fabric. At least one layer of epoxy impregnated fabric is cured to the plaster impregnated fabric. The resulting mold is removed from the male mandrel.

Another aspect of this invention is a method of molding using the mold made by the method of this invention.

Yet another aspect of this invention is directed to molds made by the method of this invention.

The foregoing and other objects, features and advantages will be apparent from the specification and claims which will illustrate an embodiment of the invention.

BEST MODE FOR CARRYING OUT THE INVENTION

It is preferred that the materials used in this invention (e.g., tooling plaster, gel coat, flexible resin, high strength resin) are capable of being cured at room temperatures under atmospheric pressure in less than about 24 hours. This results in a simple process that can be accomplished at remote sites and greatly lowers capital expenditures for ovens, pressurizing devices and autoclaves.

Tooling plaster provides the main matrix material for the composite molds of this invention. It is preferable that the tooling plaster be lightweight, inexpensive, have a high strength when cured, and be capable of curing at room temperature under atmospheric pressures in less than about 24 hours. Typically, the tooling plaster is calcium or lime based and preferably has fibers (e.g., glass) for added strength. Preferably, the tooling plaster is premixed with water to attain the desired consistency for application. It is especially preferred that ULTRACAL 30 TM tooling plaster available from Kirkpatrick Concrete Company (Birmingham, Ala.) and ULTRACAL 30 TM plaster available from U.S. Gypsum Company (Chicago, Ill.) are used because they are inexpensive and provide mold bulkiness. Preferably, there are about 1 to about 2 plaster layers each about 1 cm to about 1.25 cm in thickness so as to provide strength.

As the fabric reinforcement of the various composite layers of the molds of this invention, it is preferred that a fabric that is low cost, heavyweight, and has good wetting properties is used; the latter provides a faster wet-through of the resin. It is also preferred that the fabric is a woven ply instead of mat because of its ease of workmanship. A weight of 9.6 ounces fibers per square yard is exemplary for the weave. Typically, two different thicknesses of fabric reinforcement are used in the composite molds of this invention. It is preferred that the first fabric thickness is about 0.015 inch to about 0.017 inch thick as this provides complete wetting and better malleability with a stronger bond. This thickness is applied close to the gel coat layer resulting in a smoother surface. It is preferred that the second thickness is about 0.020 inch to about 0.025 inch thick as this provides strength. Preferably, this thicker material is used where conformance to the desired shape is less critical, thus facilitating a quicker mold thickness build-up. Generally, glass fibers, polyaramid or, nylon, fibers are used in the fabric reinforcement. However, it is preferred that glass fibers are used because of their overall strength and low cost. VOLAN TM fabric available from Air Tech International, Inc. (Carson, Calif.) or VOLAN TM fabric available from Advanced Plastics, Inc. (Nashville, Tenn.) is an exemplary material.

As the gel coat or outermost coat for this mold, it is preferred that a gel coat capable of imparting a smooth surface to the article to be molded is used in order to eliminate faults and lines on the resultant molded parts. It is also preferable that the gel coat cures at room temperature under atmospheric pressure in less than about 4 hours. It is preferred that the gel coat also has minimum shrinkage, and provides a hard smooth surface. Preferably about 3 to about 4 layers, each at least 10 mils thick, are used to ensure that the mold is adequately covered. Generally, an epoxy or polyester gel coat can be used. An exemplary material is POLYES- TER TOOLING ™ gel coat available from Advanced Plastics, Inc. (Nashville, Tenn.).

It is preferred that a flexible resin is applied next to the gel coat, since that is where the mold is exposed to the most stress. It is also preferred that the resin cures at room temperature under atmospheric pressures in less than about 24 hours. It is preferred that the flexible resin has good chemical and corrosion resistance, high heat resistance and good strength. It is preferred each layer is about 15 to about 20 mils thick. Typically, about four to about six layers are used to provide sufficient strength. Preferably, a polyester resin is used because polyester resins lay up with fewer voids, resulting in fewer mold losses. An exemplary material is POLYLIGHT ™ polyester adhesive available from Reichhold Chemicals, Inc. (Jacksonville, Fla.).

A high strength resin that preferably has good physical properties (e.g., lap shear strength, T-peel strength, heat resistance) is also used. In addition, the high strength resin is preferably a room temperature curing resin that cures under atmospheric pressure in less than about 24 hours. It is preferred that each layer is about 15 to about 20 mils thick to provide an overall adequate thickness. It is preferred that an epoxy resin is used because of the strength it provides. It is especially preferred that ARMSTRONG C-1 ™ epoxy available from Armstrong Products Company (Warsaw, Ind.) or HYSOL EA-934 ™ epoxy available from Hysol Division (Pittsburg, Calif.) is used because of its proven strength and stability. According to this invention, a plurality of gel coats are applied to a mold which has been configured to the shape of the article to be molded. It is preferable that the gel coats are applied by a brush-on process. It is also preferable that gel coats are applied at room temperature under atmospheric pressure in less than about 2 hours due to the gel coat pot life. It is especially preferred to leave the outermost gel layer uncured and to apply a layer of the above-described fabric to the uncured gel coat. Then alternating layers of flexible adhesive (described above) and fabric are applied and preferably cured at room temperature under atmospheric pressure in less than about 24 hours. By applying the fabric to the outermost gel layer which is uncured, the fabric is more completely wetted resulting in the elimination of voids and bonding faults between the gel coats and flexible resin layers.

Then alternating layers of the above-described high strength adhesive and fabric are applied and preferably cured at room temperature under atmospheric pressures in less than about 16 hours. Then alternating layers of the above-described tooling plaster and fabric are applied by a brush-on process and allowed to dry preferably at room temperature under atmospheric pressure in less than about 24 hours. Finally, alternating layers of the above-described high strength adhesive and fabric are applied by a brush-on process and allowed to cure preferably at room temperature under atmospheric pressure in less than about 24 hours.

This process results in a lightweight mold having sufficient strength so that it may be reusable.

EXAMPLE

Three 15–20 mil thick layers of POLYESTER TOOLING ™ gel were brushed on to the desired mold plug which had been previously coated with a mold release agent. Each gel coat was allowed to set up for 1.5 hours.

Five layers of 0.016–0.017 inch thick glass fiber cloth were applied to the surface of the cured gel coat and a 15–20 mil layer of POLYLITE ™ polyester adhesive was brushed on between each layer of glass fiber cloth. Then two layers of 0.020–0.025 inch glass fiber cloth were applied. The resultant polyester composite coating was cured over 24 hours.

Five more layers of 0.016–0.017 inch thick glass fiber cloth were applied on the surface of the cured Polylite polyester adhesive and a 15–20 mils thick layer of ARMSTRONG C-1 ™ epoxy resin was brushed on between each layer. Two layers of 0.020–0.025 inch thick glass fiber cloth were applied on top. The epoxy composite layers were cured for 24 hours. About 1 to about 1.25 cm of a mixture (% solids) of ULTRACAL 30 ™ tooling plaster and water was brushed on and then a 0.020–0.025 inch thick layer of glass fiber cloth was applied. The glass fiber cloth was covered with a 0.125 inch thick layer of ULTRACAL 30 ™ tooling plaster and the tooling plaster was allowed to dry for 24 hours.

After the tooling plaster had dried, a 15–20 mils coating of HYSOL EA-934 ™ epoxy resin was brushed on the entire mold. One 0.016–0.017 inch thin layer of glass fiber cloth was applied followed by another 15–20 mils layer of HYSOL EA-934 resin as a sealing coat. The HYSOL EA-934 ™ epoxy resin was allowed to cure for 24 hours.

After the HYSOL EA-934 ™ resin was cured, the mold was removed from the plug, cleaned, sanded and finished to the desired cosmetic effect.

These molds can be used to custom fit ablative material to virtually any configuration. Molds may be made in one or a plurality of pieces. Multipiece molds may be attached by conventional methods such as the use of layers of metal at the interface between mold pieces. This provides a separation point as well as adding strength at the junction. In use, the mold is loaded with a desired molding material and pressed or seated onto the corresponding article that is to be coated. It is preferable to have a layer of molding material already deposited thereon to insure minimum air pockets. The mold and ablatives are cured followed by removal of the part from the mold. Although this mold and process has been described in terms of its use for applying ablative materials, it should be understood that this process has a variety of other applications especially where readily available, inexpensive and quick fabrication procedures are required, such as molding soft rubbers, and RTV silicone parts.

This molding process makes a significant advance in this field of art as it provides an easy, quick fabrication procedure that can be accomplished at room temperatures and atmospheric pressures without expensive, costly lab equipment or tooling. Further, the mold material is resistant to attack by such solvents as methylene chloride, perchloroethylene, etc. The mold is highly durable against physical impact, surface abrasion, changes in ambient conditions, and is long-lasting. The mold has high strength, allowing it to be used in a high pressure environment where required. In addition, the molding process facilitates the attaining of a custom fit to precise tolerances. Finally, the mold is universally applicable and enables the application of virtually any molding material to a compatible substrate.

It should be understood that the invention is not limited to the particular embodiments shown and described herein, but that various changes and modifications may be made without departing from the spirit and scope of this novel concept as defined by the following claims.

We Claim:

1. A method of manufacturing a mold particularly adapted for forming a complex shape comprising:
   (a) applying at least one layer of gel to a male mandrel and curing said gel layer wherein said gel is selected from the group consisting of epoxy and polyester;
   (b) curing at least one layer of polyester impregnated fabric to said gel layer;
   (c) curing at least one layer of epoxy impregnated fabric to said polyester impregnated fabric;
   (d) curing at least one layer consisting essentially of plaster impregnated fabric to said epoxy impregnated fabric;
   (e) curing at least one layer of epoxy impregnated fabric to said plaster impregnated fabric to manufacture said mold; and
   (f) removing said mold from said male mandrel; wherein said curing steps are capable of being accomplished at room temperature under atmospheric pressures.

* * * * *

UNITED STATES PATENT AND TRADEMARK OFFICE
CERTIFICATE OF CORRECTION

PATENT NO. : 4,925,611

DATED : May 15, 1990

INVENTOR(S) : Charles H. Shockney, Roger L. Hill, William T. White

It is certified that error appears in the above-identified patent and that said Letters Patent is hereby corrected as shown below:

Column 2, line 49, delete the comma (,) (fourth occurrence)

Signed and Sealed this

Sixteenth Day of July, 1991

Attest:

HARRY F. MANBECK, JR.

Attesting Officer

Commissioner of Patents and Trademarks